(12) United States Patent
Lee et al.

(10) Patent No.: US 11,951,803 B2
(45) Date of Patent: Apr. 9, 2024

(54) HVAC SYSTEM FOR CARGO VEHICLE

(71) Applicants: Hyundai Motor Company, Seoul (KR); Kia Corporation, Seoul (KR)

(72) Inventors: Sang Shin Lee, Suwon-si (KR); Yoon Hyung Lee, Seongnam-si (KR); Byoung Hyun Ji, Goyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/961,485

(22) Filed: Oct. 6, 2022

(65) Prior Publication Data

US 2023/0150339 A1  May 18, 2023

(30) Foreign Application Priority Data

Nov. 15, 2021  (KR) .................. 10-2021-0156745

(51) Int. Cl.
*B60H 1/00* (2006.01)

(52) U.S. Cl.
CPC ..... *B60H 1/00849* (2013.01); *B60H 1/00064* (2013.01); *B60H 1/00842* (2013.01); *B60H 2001/00085* (2013.01)

(58) Field of Classification Search
CPC .................................................. B60H 1/0005
See application file for complete search history.

(56) References Cited

U.S. PATENT DOCUMENTS

| | | | | |
|---|---|---|---|---|
| 978,284 A | * | 12/1910 | Garland | B60H 1/00064 62/460 |
| 2,755,072 A | * | 7/1956 | Kreuttner | F24F 3/0522 165/59 |
| 4,505,126 A | * | 3/1985 | Jones | F25D 23/069 296/181.6 |
| 5,016,704 A | * | 5/1991 | Ono | B60H 1/00064 165/203 |
| 5,029,450 A | * | 7/1991 | Takano | F25D 17/06 62/239 |
| 5,129,235 A | * | 7/1992 | Renken | F25D 19/04 454/91 |

(Continued)

FOREIGN PATENT DOCUMENTS

| | | | | | |
|---|---|---|---|---|---|
| CN | 105848935 A | * | 8/2016 | ......... | B60H 1/00064 |
| CN | 111660768 A | * | 9/2020 | ......... | B01D 46/0023 |

(Continued)

OTHER PUBLICATIONS

FR-2743027-A1 English machine translation (Year: 1997).*

*Primary Examiner* — Jenna M Maroney

(74) *Attorney, Agent, or Firm* — Morgan, Lewis & Bockius LLP

(57) ABSTRACT

A heating, ventilation, and air conditioning (HVAC) system for a cargo vehicle includes an evaporator, a first door, a condenser, a second door, a freezing room, a refrigerating room, a warming room, and a controller, wherein the controller is configured to control an amount of opening of each of the first internal air and external air door, the second internal air and external air door, the first door, and the second door and an amount of driving of each of the evaporator and the condenser in response to an outside air condition of a vehicle, controlling temperature of each of the freezing room, the refrigerating room, and the warming room.

19 Claims, 6 Drawing Sheets

(56) References Cited

U.S. PATENT DOCUMENTS

| | | | | |
|---|---|---|---|---|
| 5,161,848 A * | 11/1992 | Lutton | B60P 3/205 | 296/181.6 |
| 5,309,731 A * | 5/1994 | Nonoyama | B60H 1/00392 | 62/324.1 |
| 5,729,983 A * | 3/1998 | Garrett | F25D 3/105 | 62/239 |
| 6,032,474 A * | 3/2000 | Dale | B60H 1/00414 | 62/239 |
| 6,213,198 B1 * | 4/2001 | Shikata | B60H 1/3207 | 62/3.61 |
| 6,345,509 B1 * | 2/2002 | Garlov | F25D 3/105 | 62/62 |
| 6,378,319 B1 * | 4/2002 | Mani | B60H 1/3232 | 62/239 |
| 6,390,378 B1 * | 5/2002 | Briscoe, Jr. | F25D 17/042 | 236/44 C |
| 6,581,022 B2 * | 6/2003 | Murakami | B60H 1/00978 | 62/133 |
| 6,640,569 B2 * | 11/2003 | Goosman | F25D 11/003 | 62/239 |
| 7,451,614 B2 * | 11/2008 | Luehrs | F25D 23/065 | 62/441 |
| 8,448,454 B2 * | 5/2013 | Bowdish | F25D 3/10 | 62/50.7 |
| 9,388,944 B2 * | 7/2016 | Bowdish | F02C 7/143 | |
| 9,649,907 B2 * | 5/2017 | Kakizaki | B60H 1/00064 | |
| 10,040,333 B2 * | 8/2018 | Shin | B60H 1/00899 | |
| 10,160,284 B2 * | 12/2018 | Park | B60H 1/00021 | |
| 10,696,135 B2 * | 6/2020 | Ceperkovic | B60H 1/00028 | |
| 11,530,849 B2 * | 12/2022 | Spath | F25D 11/003 | |
| 2005/0183855 A1 * | 8/2005 | Izawa | B60H 1/00064 | 165/203 |
| 2009/0038774 A1 * | 2/2009 | Ogiso | B60H 1/245 | 62/239 |
| 2009/0071178 A1 * | 3/2009 | Major | B60L 58/27 | 62/239 |
| 2011/0036117 A1 * | 2/2011 | Frohling | B60H 1/00921 | 62/507 |
| 2013/0340444 A1 * | 12/2013 | Bryant | F25D 29/001 | 62/62 |
| 2014/0224448 A1 * | 8/2014 | Uppuluri | B60H 1/00071 | 165/42 |
| 2015/0082820 A1 * | 3/2015 | Takahashi | B60H 1/0005 | 62/238.7 |
| 2015/0158365 A1 * | 6/2015 | Hashimoto | B60H 1/00007 | 165/41 |
| 2017/0217278 A1 * | 8/2017 | Richter | B60H 3/024 | |
| 2018/0009287 A1 * | 1/2018 | Shin | B60H 1/00842 | |
| 2018/0194195 A1 * | 7/2018 | Bryant | F25D 29/001 | |
| 2018/0319253 A1 * | 11/2018 | Martinez | B60H 1/249 | |
| 2020/0039465 A1 | 2/2020 | Ferguson et al. | | |
| 2020/0086730 A1 | 3/2020 | Hara et al. | | |
| 2020/0269650 A1 * | 8/2020 | Shan | B60H 1/32 | |
| 2023/0079403 A1 * | 3/2023 | Varghese | B60H 3/0078 | 422/186.04 |
| 2023/0081125 A1 * | 3/2023 | Varghese | A61L 9/22 | 422/20 |

FOREIGN PATENT DOCUMENTS

| | | | | |
|---|---|---|---|---|
| CN | 113459761 A | * | 10/2021 | |
| DE | 102016111718 A1 | * | 6/2017 | B60H 1/00057 |
| DE | 102020211558 A1 | * | 11/2021 | B60H 1/00021 |
| DE | 102020117073 A1 | * | 12/2021 | |
| EP | 3020583 A2 | * | 5/2016 | B60H 1/0005 |
| FR | 2743027 A1 | * | 7/1997 | B60H 1/00007 |
| FR | 3012080 A1 | * | 4/2015 | B60H 1/00064 |
| JP | 2020185961 A | * | 11/2020 | B60H 1/00921 |
| KR | 10-0815624 B1 | | 3/2008 | |
| WO | WO-2016040435 A1 | * | 3/2016 | B60H 1/00014 |
| WO | WO-2018226862 A1 | * | 12/2018 | B60H 1/00014 |
| WO | WO-2021021711 A1 | * | 2/2021 | B60H 1/00014 |

* cited by examiner

HVAC SYSTEM FOR CARGO VEHICLE

CROSS REFERENCE TO RELATED APPLICATION

The present application claims priority to Korean Patent Application No. 10-2021-0156745, filed Nov. 15, 2021, the entire contents of which is incorporated herein for all purposes by this reference.

BACKGROUND OF THE PRESENT DISCLOSURE

Field of the Present Disclosure

The present disclosure relates to an HVAC system for a cargo vehicle, and more specifically, to an HVAC system for a cargo vehicle to control an air flow introduced into a freezing room, a refrigerating room, and a warming room in response to an external air temperature of a vehicle.

Description of Related Art

As online distribution increases and distribution of freight gradually expands and takes place all over the world, the interest of a distribution industry in maintaining the quality of freight being transported for a period of distribution is increasing. Furthermore, as of 2012, the size of domestic fresh food markets was reported to reach as much as 71.1 trillion Korean won in the livestock and fishery industry, 70.6 trillion Korean won in the food manufacturing industry, and 186.3 trillion Korean won in the wholesale and retail food distribution industry. Accordingly, generating an environment in which the quality of fresh freight is maintained, such as maintaining the freshness of freight, implementing low-temperature distribution for safety during the transportation period, and the like, is emerging as an important issue.

Various items subject to fresh freight distribution are food, daily necessities, chemicals, pharmaceuticals, flowers, and the like. When such items are exposed to an environment deviating from a predetermined temperature range for a regular time period, loss such as deterioration, decay, diminution, and the like occurs, and even hygiene is negatively affected. Accordingly, to preserve the original quality and safety, constant temperature control and proper environment maintenance are required during the distribution period.

Conventionally, for quality control of fresh freight, a method of setting an expiration date by reflecting characteristics of the product and writing the expiration date down on the product has been mainly used. However, when the conventional method is applied, in the case of perishable freight, there is a lot of variability in quality depending on the distribution environment, and in particular, accuracy is insufficient because a shelf life is different depending on the time elapsed as well as temperature conditions.

On the other hand, in the distribution of such fresh freight and the like, there has been an effort to preserve quality in a manner that temperature and humidity for each delivery unit such as a container are measured and maintained constant. However, the temperature is different depending on the position where the packaging unit, such as a box, or each item is distributed within the delivery unit depending on the position of the cooling device, so there is a problem that the quality in the delivery unit is not constant.

Therefore, a cargo delivery vehicle including various types of loading rooms partitioned from each other is essential, and it has emerged that each of the loading rooms is necessary to have temperature and humidity control to be performed independently from each other.

Furthermore, recently, a cargo delivery vehicle using an autonomous vehicle has appeared, so temperature control applied to each room is essential in consideration of the battery environment of the vehicle.

The information included in the present Background of the present disclosure section is only for enhancement of understanding of the general background of the present disclosure and may not be taken as an acknowledgment or any form of suggestion that the present information forms the prior art already known to a person skilled in the art.

BRIEF SUMMARY

Various aspects of the present disclosure are directed to providing a heating, ventilation, and air conditioning (HVAC) system for a cargo vehicle configured for setting various temperatures through storage rooms of different temperatures.

The present disclosure is directed to provide the HVAC system for a cargo vehicle configured for resolving an overload state of an evaporator.

The objectives of the present disclosure are not limited to the above-mentioned objectives, and other objectives of the present disclosure not mentioned may be understood by the following description and may be seen more clearly by examples of the present disclosure. Furthermore, the objectives of the present disclosure may be realized by and combinations thereof indicated in the claims.

In various aspects of the present disclosures, according to one aspect of the present disclosure, there may be provided an HVAC system for a cargo vehicle, the HVAC system including: an evaporator configured to allow air introduced from a first internal air and external air door to flow through the evaporator; a first door located at an outflow end portion of the evaporator to control an amount of opening at a position where a freezing flow passage and a refrigerating flow passage are branched off; a condenser configured to allow air introduced from a second internal air and external air door to flow through the condenser; a second door located at an outflow end portion of the condenser to control an amount of opening at a position where the refrigerating flow passage and a warming flow passage are branched off; a freezing room located at and fluidically connected to an outflow end portion of the freezing flow passage; a refrigerating room located at and fluidically connected to an outflow end portion of the refrigerating flow passage; a warming room located at and fluidically connected to an outflow end portion of the warming flow passage; and a controller configured to control an amount of opening of each of the first internal air and external air door, the second internal air and external air door, the first door, and the second door and an amount of driving of each of the evaporator and the condenser in response to an outside air condition of a vehicle, controlling temperature of each of the freezing room, the refrigerating room, and the warming room.

Furthermore, the HVAC system may further include: a first circulation flow passage formed between an outflow end portion of the freezing room and the first internal air and external air door; a first bypass flow passage bypassing the first circulation flow passage from the outflow end portion of the evaporator to the freezing flow passage; and a first bypass valve located between the first bypass flow passage and an inflow end portion of the freezing room.

Furthermore, the first circulation flow passage may further include a first relief valve configured to selectively be in fluid connection to the outside of the vehicle.

Furthermore, the HVAC system may further include: a second circulation flow passage formed between an outflow end portion of the warming room and the second internal air and external air door; a second bypass flow passage bypassing the second circulation flow passage from the outflow end portion of the condenser; and a second bypass valve located between the second bypass flow passage and an inflow end portion of the warming room.

Furthermore, the second circulation flow passage may further include a second relief valve configured to selectively be in fluid connection to the outside of the vehicle.

Furthermore, the HVAC system may further include a third relief valve located at an outflow end portion of the refrigerating room and configured to selectively be in fluid connection to the outside of the vehicle.

Furthermore, the HVAC system may further include a first blower located at upstream of the evaporator.

Furthermore, the HVAC system may further include a second blower located at a front end portion of the condenser.

Furthermore, when an external air temperature of the vehicle is greater than a first set value, the controller may be configured to control the second door to block air introduced into the refrigerating room from the condenser and to close the first internal air and external air door.

Furthermore, when an external air temperature of the vehicle is greater than a first set value, the controller may close a first relief valve and open a second relief valve, and the air introduced into the warming room may be controlled through the second bypass valve to be relatively lower than the air discharged to the second relief valve through the second circulation flow passage.

Furthermore, when the external air temperature of the vehicle is lower than the first set value and greater than the second set value, the controller may be configured to control the first door so that the air discharged from the evaporator may be introduced into the freezing room and the refrigerating room, to control the second door so that the air discharged from the condenser may be introduced into the refrigerating room and the warming room, and to close the first internal air and external air door.

Furthermore, when the external air temperature of the vehicle is lower than the second set value, the controller may be configured to control the second door so that the air may be introduced from the condenser into the refrigerating room and the warming room and to close the second internal air and external air door Furthermore, when the external air temperature of the vehicle is lower than the second set value, the controller may be configured to close the second internal air and external air door and a second relief valve and to circulate the air introduced into the warming room through the second circulation flow passage.

Furthermore, when the external air temperature of the vehicle is lower than the second set value, the controller may be configured to open the first internal air and external air door and to allow a relatively small flow rate of the air discharged from the evaporator to be introduced into the freezing room and a relatively large flow rate to be discharged through a first relief valve through the first bypass valve.

Furthermore, the HVAC system may further include a third bypass valve configured to selectively open between an inflow end portion of the evaporator and the outflow end portion of the condenser.

Furthermore, when an operating load of the evaporator is determined to be greater than a set value, the controller may be configured to open the third bypass valve.

Furthermore, when an operating load of the evaporator is determined to be greater than a set value, the controller may be configured to convert driving of the first blower located adjacent to the evaporator to a minimum driving state.

As described above, the present disclosure can obtain the following effects by the configuration, combination, and use relationship described below with the present embodiment.

The present disclosure has the effect that temperature control is easy for a refrigerating room, a freezing room, and a warming room through an HVAC system for a cargo vehicle.

Furthermore, the present disclosure has the effect of providing a plurality of storage rooms configured for constantly maintaining the refrigerating and warming performance through the HVAC system for a cargo vehicle.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
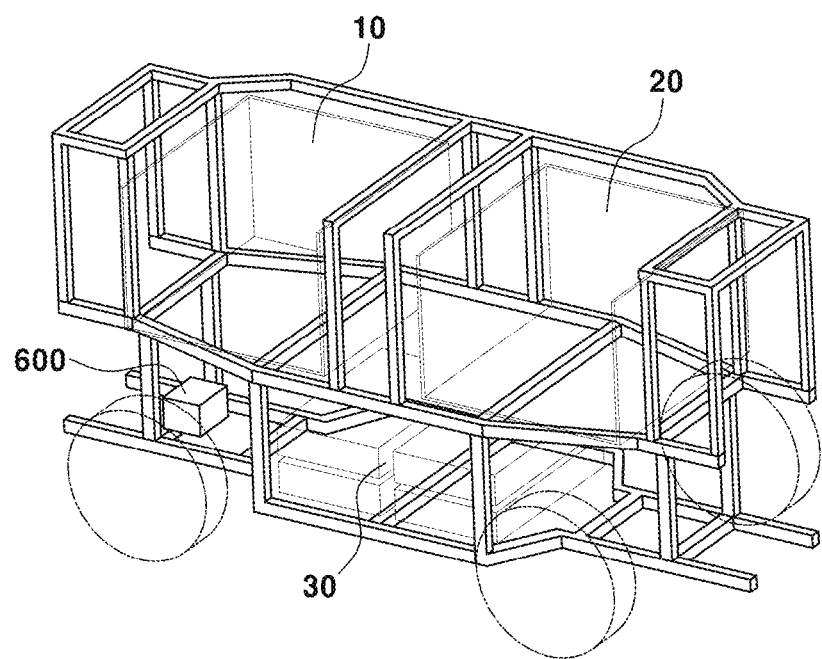
FIG. 1 is a perspective view exemplarily illustrating a vehicle including an HVAC system for a cargo vehicle of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments, it will be understood that the present description is not intended to limit the present disclosure(s) to those exemplary embodiments of the present disclosure. On the other hand, the present disclosure(s) is/are intended to cover not only the exemplary embodiments, but also various alternatives, modifications, equivalents and other embodiments, which may be included within the spirit and scope of the present disclosure as defined by the appended claims.

Hereinafter, various embodiments of the present disclosure will be described in more detail with reference to the accompanying drawings. The exemplary embodiments of the present disclosure may be modified in various forms, and the scope of the present disclosure may not be construed as being limited to the following embodiments. The present embodiments are provided to more completely explain the present disclosure to those of ordinary skill in the art.

Furthermore, terms such as ". part", ". unit", ". room", and the like described in the specification mean a unit that processes at least one function or operation and may be implemented by software, hardware, or a combination of hardware and software.

Furthermore, a reason that names of components are divided into a first, a second, and the like in the present embodiment is to distinguish the names of the components in the same relationship, and the names of components are not necessarily limited to an order thereof in the following description.

Hereinafter, the exemplary embodiment of the present disclosure will be described in detail with reference to the accompanying drawings, and in the description with reference to the accompanying drawings, the same or corresponding components are given the same reference numerals, and overlapping descriptions thereof will be omitted.

The present disclosure relates to an HVAC system for a cargo vehicle, wherein the HVAC system includes a refrigerating room 20, a freezing room 10, and a warming room 30 and is configured to distribute low-temperature air and high-temperature air. Furthermore, the HVAC system may be configured to be set and maintained at temperatures such that freezing room 10 is at −20° C., the refrigerating room 20 is at 0° C., and the warming room 30 is at 60° C.

Furthermore, a controller 600 of the present disclosure controls a plurality of valves configured to control opening of outflow ends of an evaporator 40 and a condenser 50 on the basis of the external air temperature of the vehicle, initiating a configuration configured to control the flow rate of air introduced into each of the refrigerating room 20, the freezing room 10, and the warming room 30.

Figure 2:
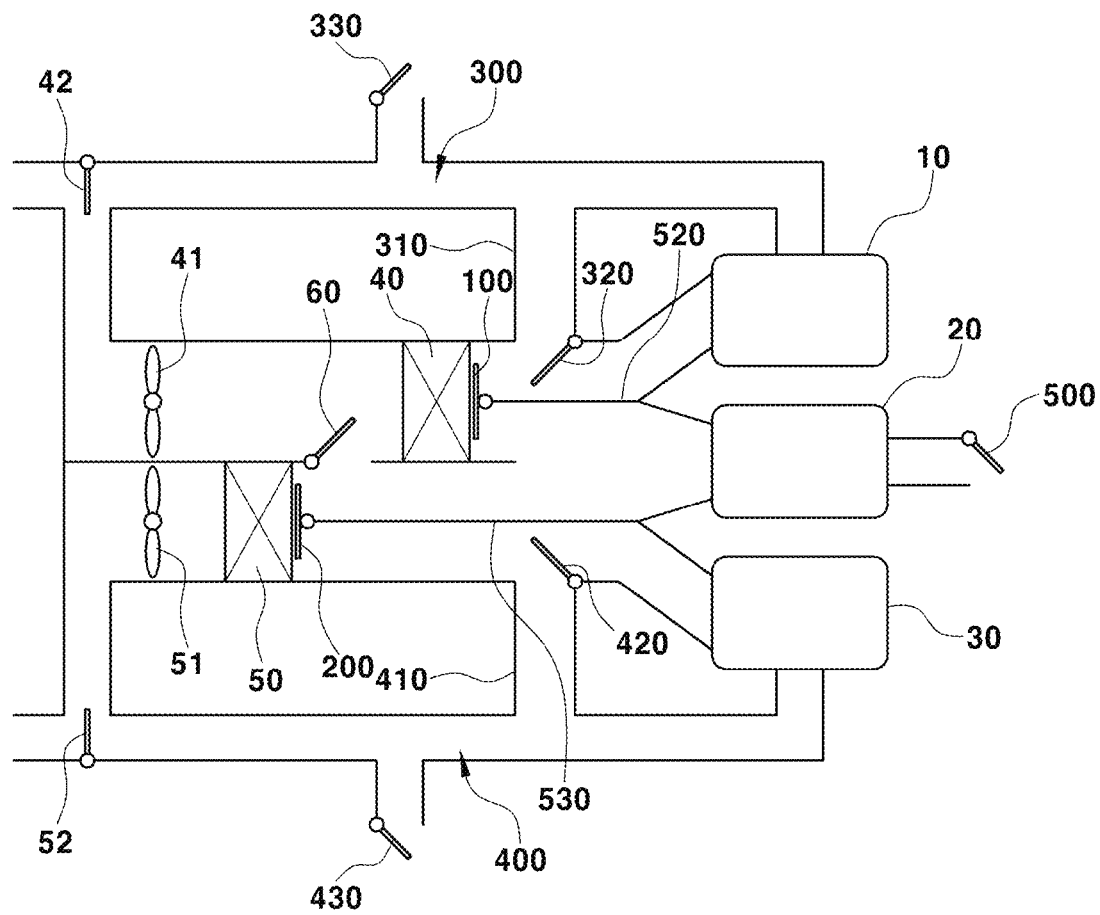
FIG. 2 is a schematic diagram illustrating the HVAC system for a cargo vehicle as an exemplary embodiment of the present disclosure.

FIG. 1 is a perspective view exemplarily illustrating a vehicle including an HVAC system for a cargo vehicle as an exemplary embodiment of the present disclosure, and FIG. 2 is a schematic diagram illustrating the HVAC system for a cargo vehicle as an exemplary embodiment of the present disclosure.

As shown, the refrigerating room 20 and the freezing room 10 may be located to be adjacent to each other at the same height, and the warming room 30 may be located at a lower position compared with the refrigerating room 20 and the freezing room 10. However, the positions of the refrigerating room 20, the freezing room 10, and the warming room 30 are not limited to the illustrated exemplary embodiments of the present disclosure.

The HVAC system of the present disclosure includes a first internal air and external air door 42 and a second internal air and external air door 52 that are respectively configured and located to introduce outside air into the evaporator 40 and the condenser 50, respectively, therethrough.

For the outside air introduced into the evaporator 40, a first blower 41 is located at upstream of the evaporator 40 and is configured to allow the outside air to flow. The outside air introduced into the evaporator 40 is configured to be discharged into the refrigerating room 20 and the freezing room 10 according to the opening of a first door 100.

For the outside air introduced into the condenser 50, a second blower 51 is located at an inflow end (upstream) of the condenser 50 and is configured to allow the outside air introduced through the second internal air and external air door 52 to be introduced into the condenser 50. Furthermore, the HVAC system includes a second door 200 so that the outside air introduced into the condenser 50 may be selectively discharged into the refrigerating room 20 and the warming room 30.

The first door 100 and the second door 200 are configured so that an amount of the opening of each thereof may be controlled by the controller 600. Furthermore, the first door 100 and the second door 200 are each configured to be movable by being slid at one end portion of an associated one of the branching flow passages. Accordingly, the first door 100 may be located such that the air discharged from the evaporator 40 selectively flows to the freezing room 10 and the refrigerating room 20 by the controller 600. Furthermore, the second door 200 may be located such that the air discharged from the condenser 50 selectively flows to the refrigerating room 20 and the warming room 30 by the controller 600.

The HVAC system may include a first circulation flow passage 300 which is formed to be in fluid connection to the freezing room 10 and the first internal air and external air door 42 and may be configured to allow the cooled air discharged from the evaporator 40 to be introduced into the first circulation flow passage 300 along a first bypass flow passage 310 through the first bypass flow passage 310 which is located between the first door 100 and the freezing room 10. Furthermore, the HVAC system may include a first bypass valve 320 configured to control an amount of the opening of the first bypass flow passage 310. Accordingly, the flow rates of the cooled air introduced into the freezing room 10 and the cooled air bypassed to the first circulation flow passage 300 may be controlled by controlling the amount of the opening of the first bypass valve 320 by the controller 600. Furthermore, the HVAC system may include a first relief valve 330 formed in the first circulation flow passage 300, being configured to allow the air introduced into the first circulation flow passage 300 to be discharged to the outside of the HVAC system.

Furthermore, the HVAC system may include a second circulation flow passage 400 configured to perform a fluid connection between the warming room 30 and the second internal air and external air door 52. Furthermore, the HVAC system may be configured so that at least a portion of the air discharged from the condenser 50 is introduced into the second circulation flow passage 400 through a second bypass flow passage 410 located between the second door 200 and the warming room 30. Furthermore, the HVAC system may include a second bypass valve 420 configured to control opening and closing of the second bypass flow passage 410, and the second bypass valve 420 may be controlled by the controller 600 to control an amount of opening thereof. Accordingly, the air introduced into the warming room 30 and/or the high-temperature air discharged from the condenser 50 may be selectively introduced into the second circulation flow passage 400. Moreover, the HVAC system is configured to such that the air introduced into the second circulation flow passage 400 may be discharged to the outside of the HVAC system through a second relief valve 430 located in the second circulation flow passage 400.

The refrigerating room 20 is configured to be in fluid connection to an outflow end portion of the evaporator 40 and an outflow end portion of the condenser 50 to allow both the air discharged from the evaporator 40 and the air discharged from the condenser 50 to be introduced thereinto. Therefore, according to the control of the first door 100 and the second door 200 by the controller 600, the flow rate of the air introduced into the refrigerating room 20 is controlled.

In an exemplary embodiment of the present invention, a first baffle 520 is provided in front of the first door 100 to separate the air discharged from the evaporator 40 into the freezing flow passage fluidically connected to the freezing room 10 and the refrigerating flow passage 530 fluidically connected to the refrigerating room 20, and a second baffle 540 is provided in front of the second door 200 to separate the air discharged from the condenser 50 into the refrigerating flow passage fluidically connected to the refrigerating room 20 and the warming flow passage fluidically connected to the warming room 30.

Furthermore, the HVAC system includes a third bypass valve 60 formed between an outflow end portion of the condenser 50 and the inflow end portion of the evaporator 40 and being able to be selectively opened and closed. The third bypass valve 60 is configured to be opened by the controller 600 when the evaporator 40 is in a super-cooled state, so that the HVAC system is configured to allow the high-temperature air of the condenser 50 to be introduced into the evaporator 40. Moreover, when the operating load of the evaporator 40 is greater than a set value in the controller 600, the HVAC system is configured to open the third bypass valve 60, relieving the super-cooled state of the evaporator 40.

The controller 600 may receive external air temperature information of the vehicle through an external air temperature sensor located in the vehicle and control an amount of the opening of the first internal air and external air door 42, the second internal air and external air door 52, the first door 100, the second door 200, the first bypass valve 320, the second bypass valve 420, the third bypass valve 60, the first relief valve 330, the first 2 relief valve 430, and a third relief valve 500, on the basis of the received external air information. Furthermore, the controller 600 is configured to control an amount of driving of each of the evaporator 40 and the condenser 50 in response to set temperatures of the freezing room 10, the refrigerating room 20, and the warming room 30 and is also configured to be able to control the number of rotation of each of the first blower 41 and the second blower 51.

Furthermore, the controller 600 is configured to compare the external air temperature with the first set value and the second set value, controlling the opening of each of doors, the amount of driving of each of the evaporator 40 and the condenser 50, and the number of rotation of each of the blowers to maintain the set temperature of each of the freezing room 10, the refrigerating room 20, and the warming room 30.

Hereinafter, FIG. 3, FIG. 4, and FIG. 5 each show a control state of the opening of each of the doors according to the external air temperature.

Figure 3:
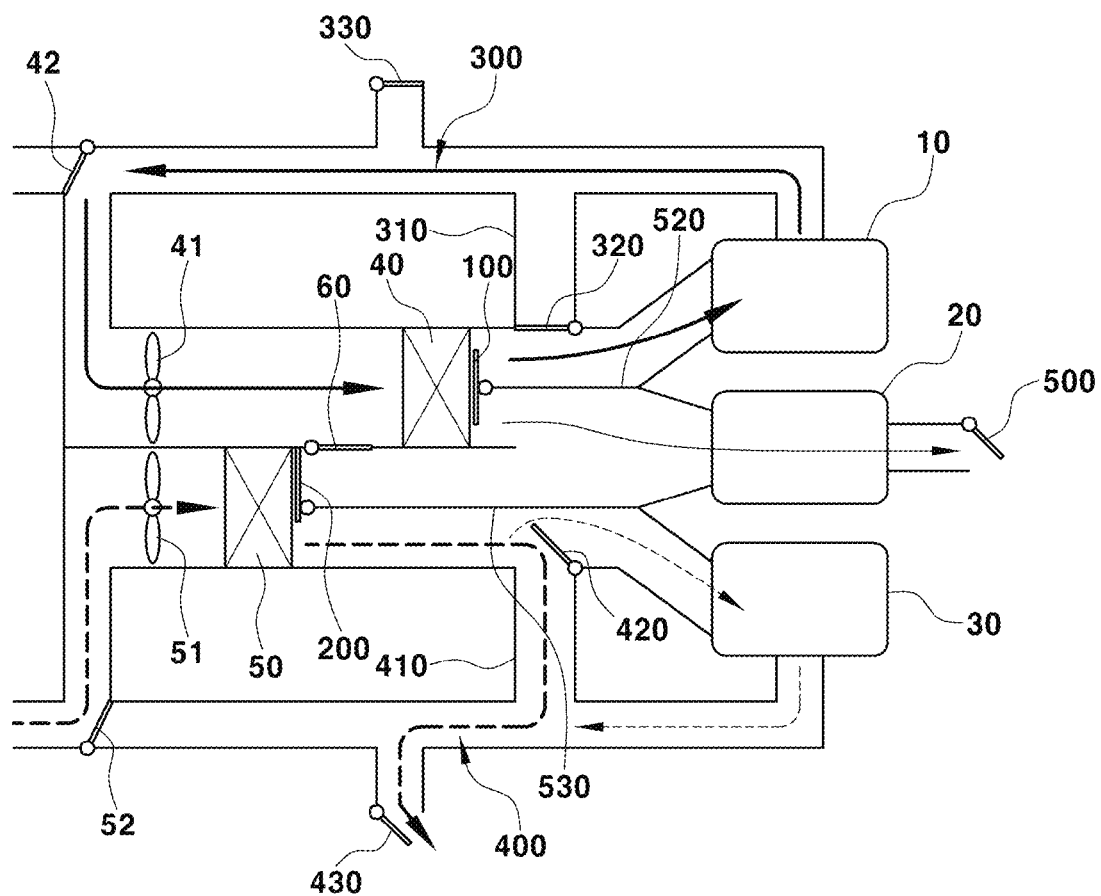
FIG. 3 is a diagram illustrating a control state of the HVAC system for a cargo vehicle when an external air temperature of the vehicle is greater than a first set value as an exemplary embodiment of the present disclosure.

FIG. 3 is a diagram illustrating a driving relationship of the HVAC system for a cargo vehicle when the external air temperature received by the control unit 600 is greater than a first set value as an exemplary embodiment of the present disclosure.

Here, a case in which the external air temperature received by the controller 600 is no less than the first set value may, in general, mean a state in which the external air temperature is typically no less than 30° C.

As the HVAC system is configured so that the cooling load of the evaporator 40 applied to the freezing room 10 is large in a state in which the external air temperature is high, the HVAC system is controlled in a state the first relief valve 330 is closed in order not to allow the air discharged through the evaporator 40 is discharged to the outside thereof. Moreover, the first internal air and external air door 42 is switched to a closed state so that high-temperature external air is not introduced into the HVAC system.

Furthermore, the HVAC system is configured so that the controller 600 controls a rotation speed of the first blower 41 to increase so that an amount of the air introduced into the evaporator 40 increases and allows the air cooled from the evaporator 40 to flow to the inside of the refrigerating room 20 and the freezing room 10 through the first door 100.

The controller 600 is configured to maintain the first bypass valve 320 to be in a closed state when the external air temperature is no less than the first set value, and thus the air discharged from the evaporator 40 is controlled to be introduced into the freezing room 10 and the refrigerating room 20. Furthermore, the controller 600 opens the third relief valve 500, and thus the air introduced into the refrigerating room 20 is controlled to be discharged to the outside.

On the other hand, the controller 600 opens the second internal air and external air door 52 and then controls the second door 200 so that the high-temperature air discharged through the condenser 50 is introduced into the warming room 30. Moreover, the second bypass valve 420 is opened, and a lot of high-temperature air discharged from the condenser 50 is controlled to be discharged to the second relief valve 430 through the second circulation flow passage 400. The HVAC system is configured so that a portion of the high-temperature air discharged from the condenser 50 flows through the second circulation flow passage 400 via the warming room 30.

Accordingly, in a high-temperature state, the doors are controlled such that the air cooled through the evaporator 40 is internally circulated along the first circulation flow passage 300, and the outside air is introduced into the condenser 50.

Figure 4:
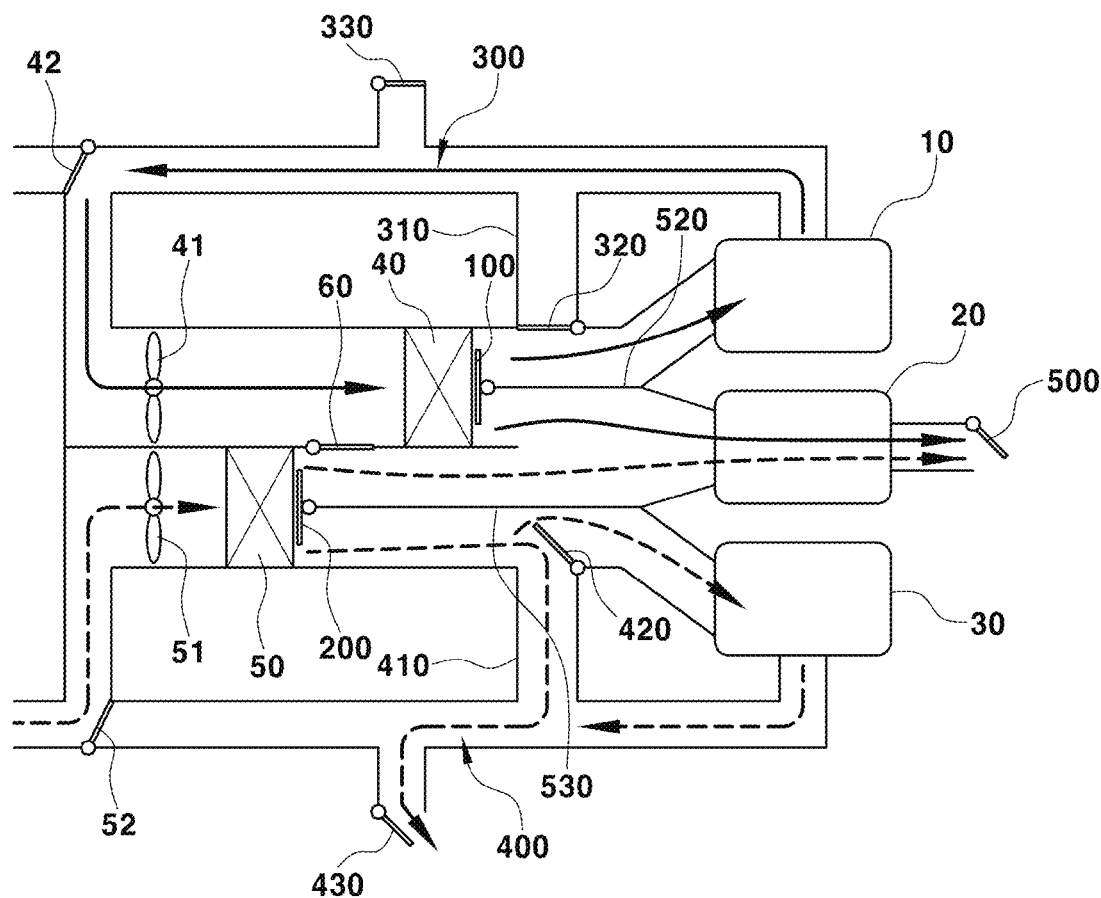
FIG. 4 is a diagram illustrating a control state of the HVAC system for a cargo vehicle when the external air temperature of the vehicle is lower than the first set value and greater than a second set value as the exemplary embodiment of the present disclosure.

Shown in FIG. 4 is a configuration of the HVAC system under the condition that the external air temperature received by the controller 600 is lower than the first set value and greater than the second set value.

Here, a case in which the external air temperature received by the controller 600 is lower than the first set value and greater than the second set value may, in general, mean the case having the external air temperature of 0° C. to 30° C.

When the received external air temperature is lower than the first set value and greater than the second set value, the controller 600 switches the first internal air and external air door 42 to a closed state and switches the first relief valve 330 to a closed state. Furthermore, the first bypass valve 320 is switched to a closed state, whereby the cooled air discharged from the evaporator 40 is controlled not to be introduced into the first circulation flow passage 300 through the first bypass flow passage 310. The HVAC system is configured so that the first door 100 is located so that the cooled air discharged from the evaporator 40 is introduced into the freezing room 10 and the refrigerating room 20 and such that the cooled air introduced into the freezing room 10 may be recycled to the evaporator 40 through the circulation flow passage.

The second internal air and external air door 52 is configured so that the second internal air and external air door 52 allows the outside air to be introduced into the condenser 50 in an open state. The HVAC system is configured so that the outside air introduced thereinto is in fluid connection to an inlet of the condenser 50, and the high-temperature air discharged from the condenser 50 is introduced into the refrigerating room 20 and the warming room 30. Moreover, the HVAC system is configured so that the second bypass valve 420 is controlled to be opened in a constant state, so that the outflow end portion of the condenser 50 and the second circulation flow passage 400 are in fluid connection. Furthermore, the HVAC system is configured so that the second relief valve 430 is opened so that the air discharged from the warming room 30 and the air introduced through the second bypass flow passage 410 are discharged to the outside of the HVAC system.

Furthermore, the air introduced into the refrigerating room 20 from the outflow end portion of the evaporator 40 and the outflow end portion of the condenser 50 is controlled to be discharged to the outside of the HVAC system through the third relief valve 500.

Figure 5:
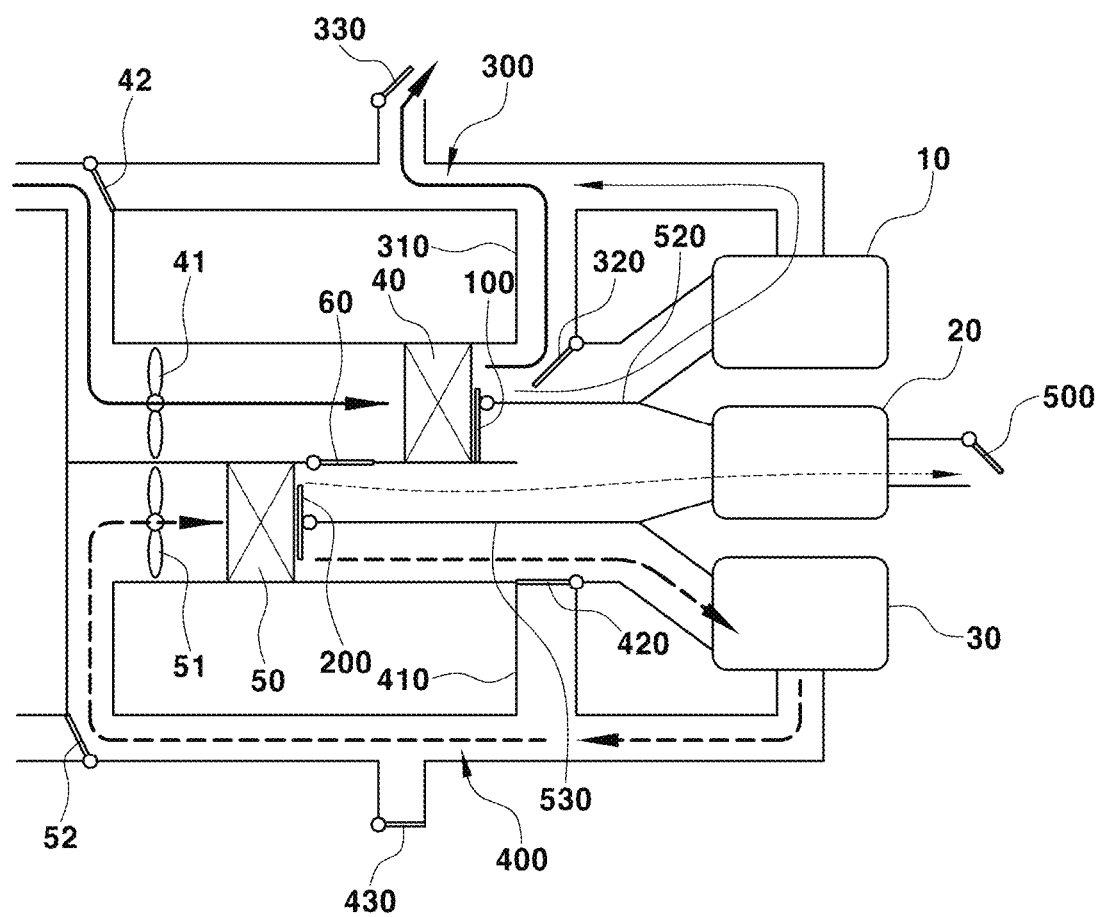
FIG. 5 is a diagram illustrating a control state of the HVAC system for a cargo vehicle when the external air temperature of the vehicle is lower than the second set value as the exemplary embodiment of the present disclosure.

FIG. 5 is a diagram illustrating a control state of the HVAC system for a cargo vehicle when the external air temperature of the vehicle is lower than the second set value as the exemplary embodiment of the present disclosure.

Here, a case in which the external air temperature received by the controller 600 is lower than the second set value may, in general, mean an outside environment below 0° C.

When the external air temperature is measured to be lower than the second set value, the HVAC system is switched to a state in which the refrigerating load is very little. Accordingly, the controller 600 is controlled such that the amount of driving of the first blower 41 to be reduced and the first internal air and external air door 42 to be opened to allow the outside air to be introduced into the HVAC system. Moreover, the first door 100 is switched to a position being in fluid connection to the freezing room 10, so that the outside air is prevented from being introduced into the refrigerating room 20.

Furthermore, because the first bypass valve 320 is maintained in an open state, the HVAC system is configured so that the cooled air discharged from the evaporator 40 is branched off and introduced into the first circulation flow passage 300 and the freezing room 10 and then discharged to the outside of the HVAC system through the relief valve 330.

Moreover, when the external air temperature is lower than the second set value, the evaporator 40 is configured to function as a heat pump configured to absorb outside heat.

On the other hand, the second internal air and external air door 52 is switched to a closed state, and the second door 200 is controlled such that the high-temperature air discharged from the condenser 50 is introduced into the refrigerating room 20 and the warming room 30. Furthermore, the second bypass valve 420 is switched to the closed state and the second relief valve 430 is switched to the closed state, whereby the HVAC system is configured so that the air discharged from the warming room 30 flows to a front end portion of the condenser 50 along the second circulation flow passage 400.

In other words, the high-temperature air is converted into an internal circulation state to flow along the warming room 30, the condenser 50, and the second circulation flow passage 400, and a portion of the high-temperature air is introduced into the refrigerating room 20 through the outflow end portion of the condenser 50. Moreover, the air introduced into the refrigerating room 20 may be discharged to the outside of the HVAC system through the third relief valve 500. Furthermore, the second bypass valve 420 and the second relief valve 430 are controlled by the controller 600 to maintain a closed state.

Accordingly, when the external air temperature is lower than the second set value, the load of the condenser 50 for performing the temperature increase increases, so that the HVAC system is driven in an internal circulation mode to prevent the introduction of the outside air into the fluid flow passage being in fluid connection to the condenser 50.

Figure 6:
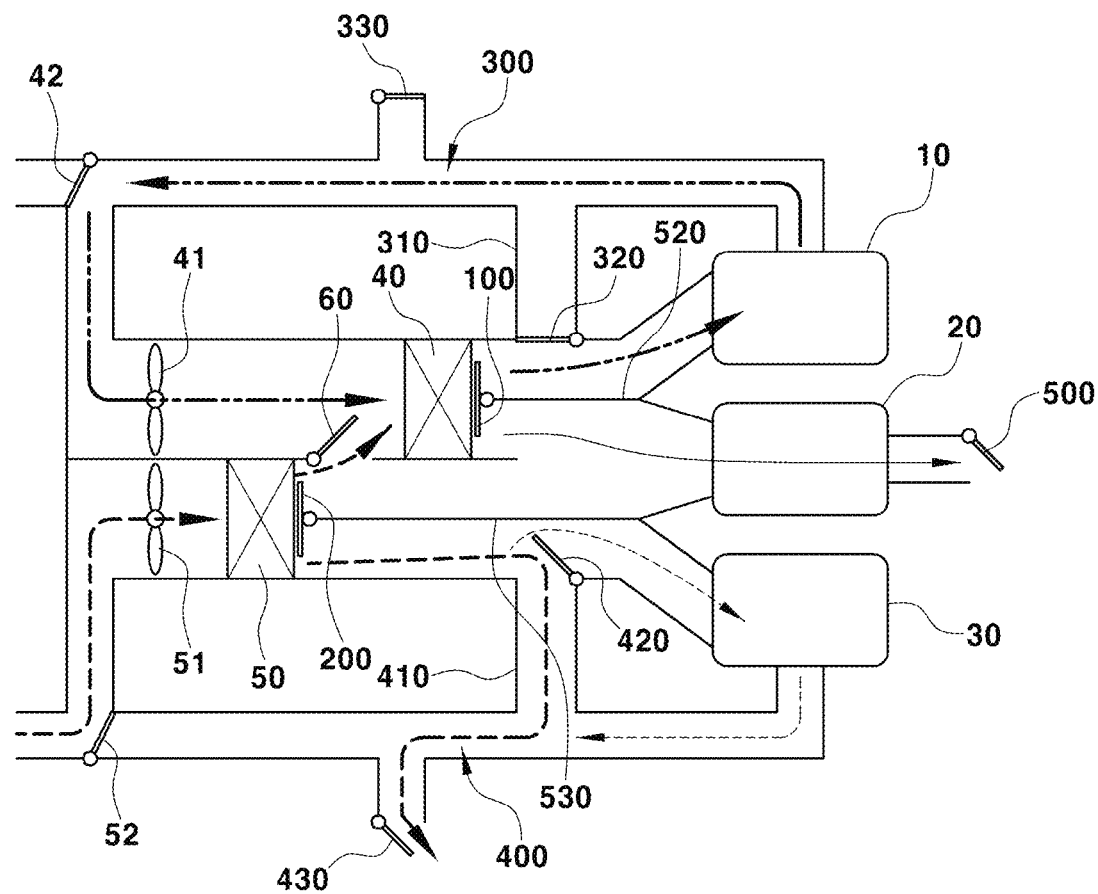
FIG. 6 is a diagram illustrating a control state of the HVAC system for a cargo vehicle when a load of the evaporator is no less than a set value as the exemplary embodiment of the present disclosure.

In the case of FIG. 6, when the evaporator 40 is supercooled, that is, when the operating load of the evaporator 40 is greater than the set value, the HVAC system is configured so that the evaporator 40 is thawed using the high-temperature air of the condenser 50.

The controller 600 is configured to measure the operating load of the evaporator 40 and to open the third bypass valve 60 when the measured operating load is no less than the set value. Furthermore, the HVAC system is configured so that the controller 600 closes the first internal air and external air door 42 and the first relief valve 330 and closes the first bypass valve 320.

Furthermore, the controller 600 controls the amount of driving of the first blower 41 located adjacent to the evaporator 40 to be converted into a minimum and the air discharged through the first door 100 to be introduced into the freezing room 10 and the refrigerating room 20.

Furthermore, the HVAC system is configured so that the third bypass valve 60 is opened, allowing relatively high-temperature air to be introduced from the outflow end portion of the condenser 50 into the inflow end portion of the evaporator 40.

The controller 600 opens the third bypass valve 60 and at the same time opens the second internal air and external air door 52, opens the second bypass valve 420, and also opens the second relief valve 430. Accordingly, the high-temperature air discharged from the outflow end portion of the condenser 50 facing the refrigerating room 20 flows to the inflow end portion of the evaporator 40. Moreover, the HVAC system is configured so that a portion of the air flowing along the warming room 30 is introduced into the second circulation flow passage 400 according to the opening of the second bypass valve 420 and is discharged to the second relief valve 430 by being mixed with the air discharged from the warming room 30 thereafter.

Accordingly, in the present disclosure, when the evaporator 40 is determined to be overcooled according to the operating load of the evaporator 40, the HVAC system is configured to arrange the outflow end portion of the condenser 50 and the inflow end portion of the evaporator 40 to be in fluid connection to perform the thawing process.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In an exemplary embodiment of the present disclosure, each operation described above may be performed by a control device, and the control device may be configured by a plurality of control devices, or an integrated single control device.

In an exemplary embodiment of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A heating, ventilation, and air conditioning (HVAC) system for a vehicle, the HVAC system comprising:
    an evaporator configured to allow air introduced from a first internal air and external air door to flow through the evaporator;
    a first door located at an outflow end portion of the evaporator to control an amount of opening at a position where a freezing flow passage and a refrigerating flow passage are branched off;
    a condenser configured to allow air introduced from a second internal air and external air door to flow through the condenser;
    a second door located at an outflow end portion of the condenser to control an amount of opening at a position where the refrigerating flow passage and a warming flow passage are branched off;
    a freezing room located at and fluidically connected to an outflow end portion of the freezing flow passage;
    a refrigerating room located at and fluidically connected to an outflow end portion of the refrigerating flow passage;
    a warming room located at and fluidically connected to an outflow end portion of the warming flow passage;
    a first circulation flow passage formed between an outflow end portion of the freezing room and the first internal air and external air door;
    a first bypass flow passage bypassing the first circulation flow passage from the outflow end portion of the evaporator to the freezing flow passage; and
    a first bypass valve located between the first bypass flow passage fluidically connected to the refrigerating flow passage and an inflow end portion of the freezing room; and
    a controller configured to control an amount of opening of each of the first internal air and external air door and the second internal air and external air door, the amount of opening of each of the first door and the second door and an amount of driving of each of the evaporator and the condenser in response to an outside air condition of the vehicle, to control temperature of each of the freezing room, the refrigerating room, and the warming room.

2. The HVAC system of claim 1, wherein the first circulation flow passage further includes a first relief valve configured to selectively be in fluid connection to the outside of the vehicle.

3. The HVAC system of claim 2, further including a first baffle provided in front of the first door to separate the air discharged from the evaporator into the freezing flow passage fluidically connected to the freezing room and the refrigerating flow passage fluidically connected to the refrigerating room.

4. A heating, ventilation, and air conditioning (HVAC) system for a vehicle, the HVAC system comprising:
    an evaporator configured to allow air introduced from a first internal air and external air door to flow through the evaporator;

a first door located at an outflow end portion of the evaporator to control an amount of opening at a position where a freezing flow passage and a refrigerating flow passage are branched off;

a condenser configured to allow air introduced from a second internal air and external air door to flow through the condenser;

a second door located at an outflow end portion of the condenser to control an amount of opening at a position where the refrigerating flow passage and a warming flow passage are branched off;

a freezing room located at and fluidically connected to an outflow end portion of the freezing flow passage;

a refrigerating room located at and fluidically connected to an outflow end portion of the refrigerating flow passage;

a warming room located at and fluidically connected to an outflow end portion of the warming flow passage;

a second circulation flow passage formed between an outflow end portion of the warming room and the second internal air and external air door;

a second bypass flow passage bypassing the second circulation flow passage from the outflow end portion of the condenser; and a second bypass valve located between the second bypass flow passage fluidically connected to the refrigerating flow passage and an inflow end portion of the warming room; and a controller configured to control an amount of opening of each of the first internal air and external air door and the second internal air and external air door, the amount of opening of each of the first door and the second door and an amount of driving of each of the evaporator and the condenser in response to an outside air condition of the vehicle, to control temperature of each of the freezing room, the refrigerating room, and the warming room.

5. The HVAC system of claim 4, wherein the second circulation flow passage further includes a second relief valve configured to selectively be in fluid connection to the outside of the vehicle.

6. The HVAC system of claim 4, further including a second baffle provided in front of the second door to separate the air discharged from the condenser into the refrigerating flow passage fluidically connected to the refrigerating room and the warming flow passage fluidically connected to the warming room.

7. The HVAC system of claim 6, further including:
a third bypass valve configured to selectively open between an inflow end portion of the evaporator to the refrigerating flow passage.

8. The HVAC system of claim 1, further including:
a third relief valve located at an outflow end portion of the refrigerating room and configured to selectively be in fluid connection to the outside of the vehicle.

9. The HVAC system of claim 1, further including a first blower located at upstream of the evaporator.

10. The HVAC system of claim 1, further including a second blower located at upstream of the condenser.

11. The HVAC system of claim 1, wherein, when an external air temperature of the vehicle is greater than a first set value, the controller is configured to control the second door to block air introduced into the refrigerating room from the condenser and to close the first internal air and external air door.

12. The HVAC system of claim 4, wherein, when an external air temperature of the vehicle is greater than a first set value, the controller is configured to close a first relief valve and opens a second relief valve, and the air introduced into the warming room is controlled through the second bypass valve to be relatively lower than the air discharged to the second relief valve through the second circulation flow passage.

13. The HVAC system of claim 1, wherein, when an external air temperature of the vehicle is lower than a first set value and greater than a second set value, the controller is configured to control the first door so that the air discharged from the evaporator is introduced into the freezing room and the refrigerating room, to control the second door so that the air discharged from the condenser is introduced into the refrigerating room and the warming room, and to close the first internal air and external air door.

14. The HVAC system of claim 1, wherein, when an external air temperature of the vehicle is lower than the second set value, the controller is configured to control the second door so that the air is introduced from the condenser into the refrigerating room and the warming room and to close the second internal air and external air door.

15. The HVAC system of claim 4, wherein, when an external air temperature of the vehicle is lower than a second set value, the controller is configured to close the second internal air and external air door and a second relief valve and to circulate the air introduced into the warming room through the second circulation flow passage.

16. The HVAC system of claim 1, wherein, when an external air temperature of the vehicle is lower than a second set value, the controller is configured to open the first internal air and external air door and to allow a flow rate of the air discharged lower than a first predetermined flow rate from the evaporator to be introduced into the freezing room and a flow rate higher than a second predetermined flow rate to be discharged through a first relief valve through the first bypass valve.

17. The HVAC system of claim 1, further including a third bypass valve configured to selectively open between an inflow end portion of the evaporator and an outflow end portion of the condenser.

18. The HVAC system of claim 17, wherein, when an operating load of the evaporator is determined to be greater than a set value, the controller is configured to open the third bypass valve.

19. The HVAC system of claim 17, wherein, when an operating load of the evaporator is determined to be greater than a set value, the controller is configured to convert driving of a first blower located adjacent to the evaporator to a minimum driving state.

* * * * *